(12) United States Patent
Yu

(10) Patent No.: US 8,794,789 B2
(45) Date of Patent: Aug. 5, 2014

(54) LED WARNING LIGHT

(71) Applicant: Ningbo Yinzhou Self Photoelectron Technology Co., Ltd., Ningbo (CN)

(72) Inventor: Feng Yu, Ningbo (CN)

(73) Assignee: Ningbo Yinzhou Self Photoelectron Technology Co., Ltd, Zhejiang Province (CN)

( * ) Notice: Subject to any disclaimer, the term of this patent is extended or adjusted under 35 U.S.C. 154(b) by 120 days.

(21) Appl. No.: 13/632,452

(22) Filed: Oct. 1, 2012

(65) Prior Publication Data

US 2013/0094209 A1  Apr. 18, 2013

(30) Foreign Application Priority Data

Oct. 13, 2011  (CN) .......................... 2011 1 0309024

(51) Int. Cl.
*B60Q 1/52* (2006.01)
*B60Q 1/26* (2006.01)

(52) U.S. Cl.
CPC ................................... *B60Q 1/2611* (2013.01)
USPC ........... 362/236; 362/540; 362/545; 362/547; 362/237; 362/345

(58) Field of Classification Search
CPC .................................................... B60Q 1/2611
USPC ......... 362/236, 237, 240, 241, 247, 345, 346, 362/347, 540, 541, 542, 545, 547
See application file for complete search history.

(56) References Cited

U.S. PATENT DOCUMENTS

| | | | | |
|---|---|---|---|---|
| 6,948,836 B2 * | 9/2005 | Ishida et al. | ................... | 362/516 |
| 8,038,321 B1 * | 10/2011 | Franck et al. | ............ | 362/249.02 |
| 8,608,341 B2 * | 12/2013 | Boomgaarden et al. | . | 362/249.02 |
| 2007/0159819 A1 * | 7/2007 | Bayat et al. | ................... | 362/236 |

* cited by examiner

*Primary Examiner* — Ali Alavi
(74) *Attorney, Agent, or Firm* — Lowe Hauptman & Ham, LLP

(57) ABSTRACT

In a LED warning light, straight light units are fixed to straight peripheries of a warning light body, and curved light units are fixed to joints adjacent to two respective straight peripheries. Each straight light unit includes a light base, a reflective plate, a heat dispersion cover and a front cover. LED lights are arranged on the light base. The front cover is perpendicular to the light base opposite to the reflective plate. The reflective plate has light reflective elements connected to each other in a straight line. Light rays emitted from the LEDs are reflected by the reflective plate and then given off perpendicularly to the front cover. The vertical distance from an upper periphery of the arc top of the light reflective element to the corresponding inner surface of the heat dispersion cover is more than or equal to zero.

9 Claims, 7 Drawing Sheets

LED WARNING LIGHT

RELATED APPLICATIONS

The present application claims priority from, Chinese Application Number 201110309024.1, filed Oct. 13, 2011, the disclosure of which is hereby incorporated by reference herein in its entirety.

TECHNICAL FIELD

The present invention relates to a technical field of a warning and alarm light, and in particular, to a reflective slim LED warning light.

BACKGROUND ART

The conventional warning light bars being used currently are such warning light bars that use LEDs as light sources. This warning light bar usually includes a warning light body, a plurality of LED light units disposed at the front and the back ends of the light body, lenses that correspond to the LED light units, and supporting legs connected to the bottom of the light body for connecting to the vehicle. On the left and right sides of the light body, a light unit seat is connected, respectively. An end cover and a plurality of LED light units are coupled onto the light unit seat. However, the corners of above warning light bar are unable to emit light, causing the illumination range of the warning light to be restricted. In addition, the brightness of light spots, which are formed by the light from light sources transmitting through lenses, is still not sufficient. This is because a portion of light would be lost during refraction, which causes a waste of luminous energy. In view of the requirement of coupling, bolts are used as coupling elements, such that the thickness of the warning light bar cannot be further reduced. The thickness of current warning light bar exceed 50 mm, since the brightness of the warning light is subjected to restriction of the height of light reflecting plate and the whole structure of the light. The thinner the warning light is, the more the brightness of the warning light would be restricted. On the other hand, in order to ensure the luminous efficiency, the thickness of the warning light bar cannot be further reduced. However, the thicker the warning light is, the heavier it would be. Then higher fastness is required when it is being mounted. This is also a reason that the thickness of current warning light cannot be reduced.

SUMMARY OF THE INVENTION

The invention is aimed to solve technical problems of the restricted illumination range, the loss of light rays and the restricted thickness of the warning light bar. Therefore, the invention discloses a LED warning light that employs a reflective plate and adhesive to take the place of lenses and bolts, respectively, in order to overcome the technical problems of the restricted illumination range, the loss of light rays and the restricted thickness in the related art.

To address such above problems, the technical solution of the invention is to provide a LED warning light, comprising a warning light body, straight light units and curved light units; the straight light units are fixed to the straight peripheries of the warning light body, and the curved light units are fixed to joints adjacent to two respective straight peripheries; the straight light unit includes a light base, a reflective plate, a heat dispersion cover and a front cover, the heat dispersion cover and the front cover are configured to form a first hermetical space in which the reflective plate and the light base are positioned; LED lights are arranged on the light base, the reflective plate is placed on one side of said LEDs, and the front cover is perpendicular to said light base oppositely to the reflective plate; the reflective plate is formed by a plurality of light reflective elements which are connected to each other in a straight line, and light rays emitted from the LEDs are reflected by the reflective plate and then given off perpendicularly to the front cover; the vertical distance from upper periphery of the arc top of the light reflective element to the corresponding inner surface of the heat dispersion cover is more than or equal to zero.

In the LED warning light, said curved light unit includes a curved light base, a curved reflective plate, a heat dispersion plate and a light cover, said curved reflective plate, said curved light base and said heat dispersion plate are connected sequentially; said curved reflective plate light is formed by the reflective elements which are connected and arranged in a curved line; said light cover and said heat dispersion plate are configured to form a second hermetical space and said light cover is transparent; the vertical distance from upper periphery of the arc top of the light reflective element to the corresponding inner surface of the top of said light cover is more than or equal to zero.

In the LED warning light according to the invention, the thickness of said warning light body is more than or equal to 20 mm.

In the LED warning light according to the invention, one side of said reflective plate opposing to said LEDs is a smooth curved surface.

In the LED warning light according to the invention, said light reflective element includes 30 reflective pieces connected to each other.

In the LED warning light according to the invention, it comprises four said curved light units.

In the LED warning light according to the invention, the radian of said curved light units is a quarter of a circle.

In the LED warning light according to the invention, said front cover is transparent.

Compared to the prior art, the present invention has following advantageous effects: without an increase of the intensity of light source, the invention effectively improves the illumination range of the LED warning light and reduces the loss of light; the thickness of the warning light body is greatly reduced, while the luminous effect can be ensured.

MODE OF CARRYING OUT THE INVENTION

Further description of the present invention is set forth in the accompanying drawings and the embodiment below. The embodiments which will be described below are provided for the purpose of explaining the invention, and will not be intended to limit the scope of the invention.

First Embodiment

Figure 1:
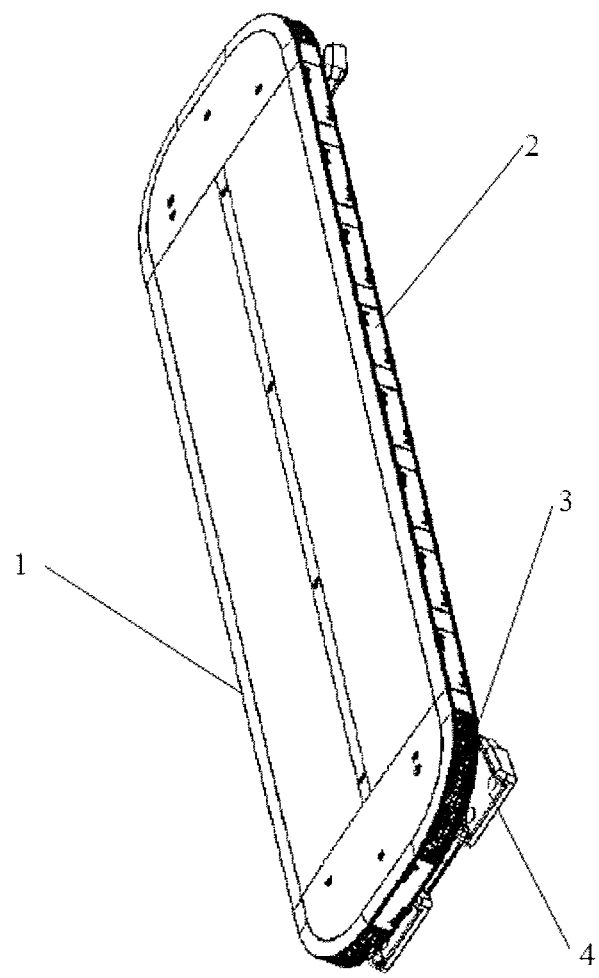
FIG. 1 is a structurally schematic view of a LED warning light according to an embodiment of the invention.

FIG. 1 shows a structurally schematic view of a LED warning light according to a first embodiment of the invention. The inventive LED warning light comprises a warning light body 1, straight light units 2 and curved light units 3. The straight light units 2 are fixed to the straight peripheries of the warning light body 1, and the curved light units 3 are fixed to joints adjacent to two respective straight peripheries. In this embodiment, LED warning light is a warning light bar. The warning light body 1 has two long sides and two short sides. The number of the straight light units 2 is even, and as required, it could be increased and decreased by pairs of the straight light units 2 to adapt to the varied vehicles. That is, in this embodiment, four curved light units 3 are required to connect with the straight light units 2, and the radian of the curved light units 3 is a quarter of a circle, namely 90 degrees. As a matter of course, if it is required, the shape of the warning light body 1 is not be limited to quadrangle, but could be other polygon. It would be apparent to ordinary person skilled in the art that when the warning light body 1 is in a shape of polygon, the radian of the curved light units 3 shall be accordingly adjusted. For example, when the warning light body 1 is in a shape of hexagon, the radian of the curved light units 3 is accordingly adjusted to a sixth of circle, namely 60 degrees. As a matter of course, the radian of the curved light units 3 is not arbitrary, and theoretically, it shall be less than or equal to half a circle, namely less or equal to 180 degrees. However, in practice, curved light units 3 having an excessively less radian would not possess practical applicability.

Figure 4:
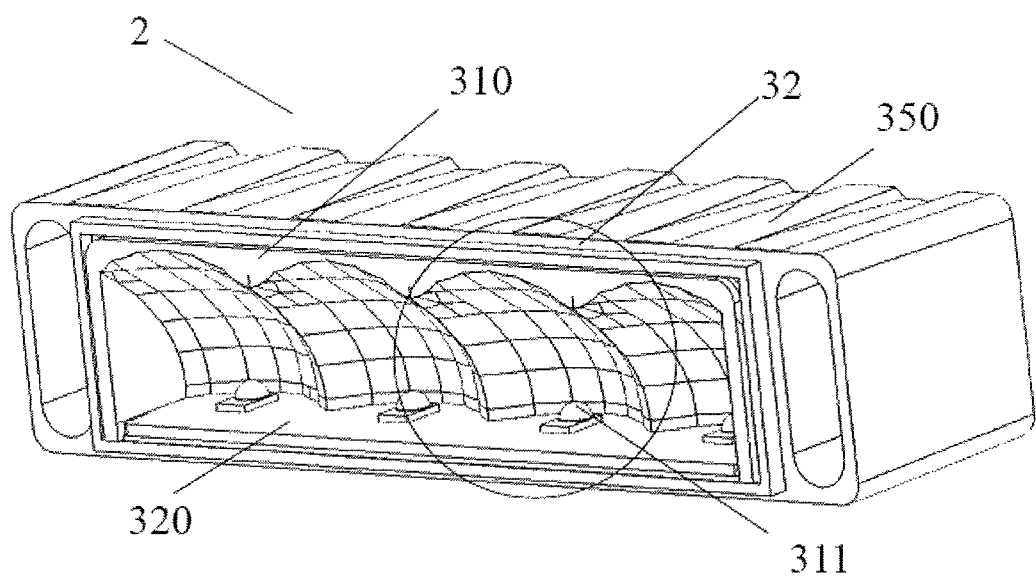
FIG. 4 is a structurally schematic view showing a side of a straight light unit 2 having reflective unit, according to the embodiment of the LED warning light of the invention, with the light cover removed.
Figure 5:
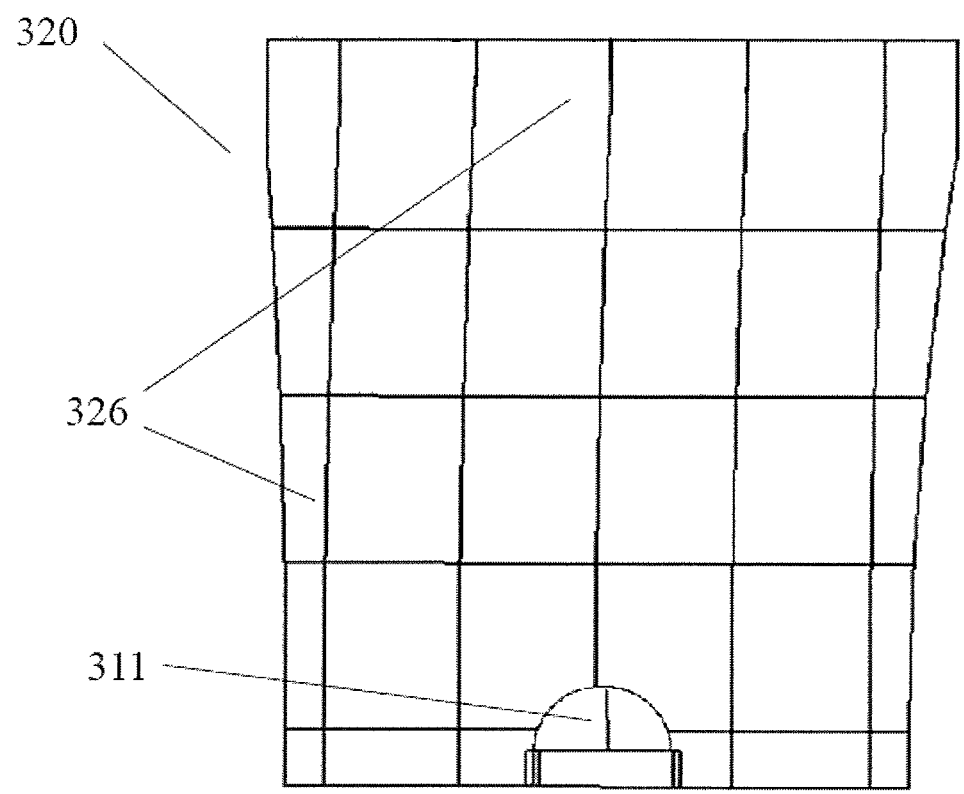
FIG. 5 is a structurally schematic view showing a reflective plate, according to the embodiment of the LED warning light of the invention.

In this embodiment, as shown in FIGS. 1, 4 and 5, the straight light unit 2 includes a light base 310, a reflective plate 320, a heat dispersion cover 350 and a front cover 340 that is not shown in figures due to its transparency. The heat dispersion cover 350 and the front cover 340 are configured to form a hermetical space in which the reflective plate 320 and the light base 310 are positioned. LED lights 311 are arranged on the light base 310, the reflective plate 320 is placed on a side of LEDs 311, and the front cover 340 is perpendicular to the light base 310 oppositely to the reflective plate 320. The reflective plate 320 is formed by a plurality of light reflective elements 32 which are connected to each other in a straight line and each of which is made up of 30 reflective pieces 326 connected to each other.

The light rays emitted from the LEDs 311 are reflected by the reflective plate 320 and then given off perpendicularly to the front cover 340. The vertical distance from upper periphery of the top reflective plate 320 to the corresponding inner surface of the heat dispersion cover 350 is zero.

Also, a partition block is provided between the adjacent straight light units 2.

Figure 3:
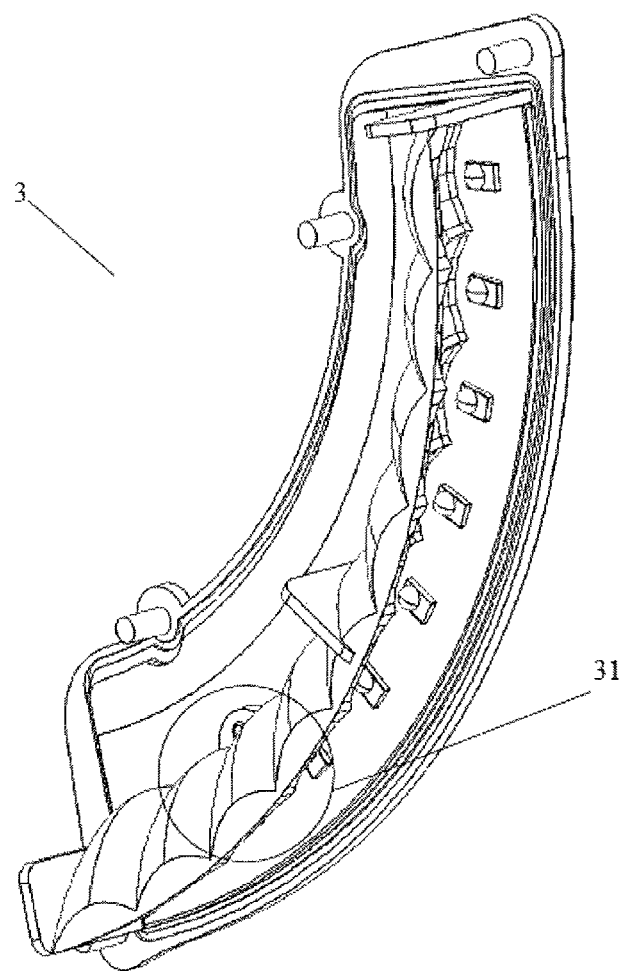
FIG. 3 is a structurally schematic view showing a side of curved light unit 3 having smooth surface, according to the embodiment of the LED warning light of the invention.

As shown in FIG. 3, one side of the reflective plate 320 opposing to LEDs 311 is a smooth curved surface. The present invention employs the reflective plate 320 in place of conventional lenses, so as to reduce the loss of light ray during the refraction and meanwhile reduce the loss of light ray due to the diffuse reflection. It can be seen in FIG. 6 that the light transmission surface of the front cover 340 is perpendicular to the light base 310 oppositely to the reflective plate 320. Therefore, light rays A and A' emitted from the LEDs 311 are reflected onto the light transmission surface of the front cover 340 via the light reflective elements 32, and then given off perpendicularly to the light transmission surface of the front cover 340, so that the loss of light ray due to refraction is reduced to a maximum degree.

The curved light unit 3 includes a curved light base 310', a curved reflective plate 320', a heat dispersion plate 330 and a light cover. The light cover and the heat dispersion plate are also configured to form a hermetical space. The light cover is not shown in figures due to its transparency.

In the curved light unit 3, compared to the straight light units 2, the thickness of the upper portion of the heat dispersion cover 350 is omitted and the thickness of the light cover is provided instead. In a similar way, the vertical distance from the top light reflective elements 32' of the curved reflective plate 320' to the corresponding inner surface of the top of the light cover is zero.

Figure 2:
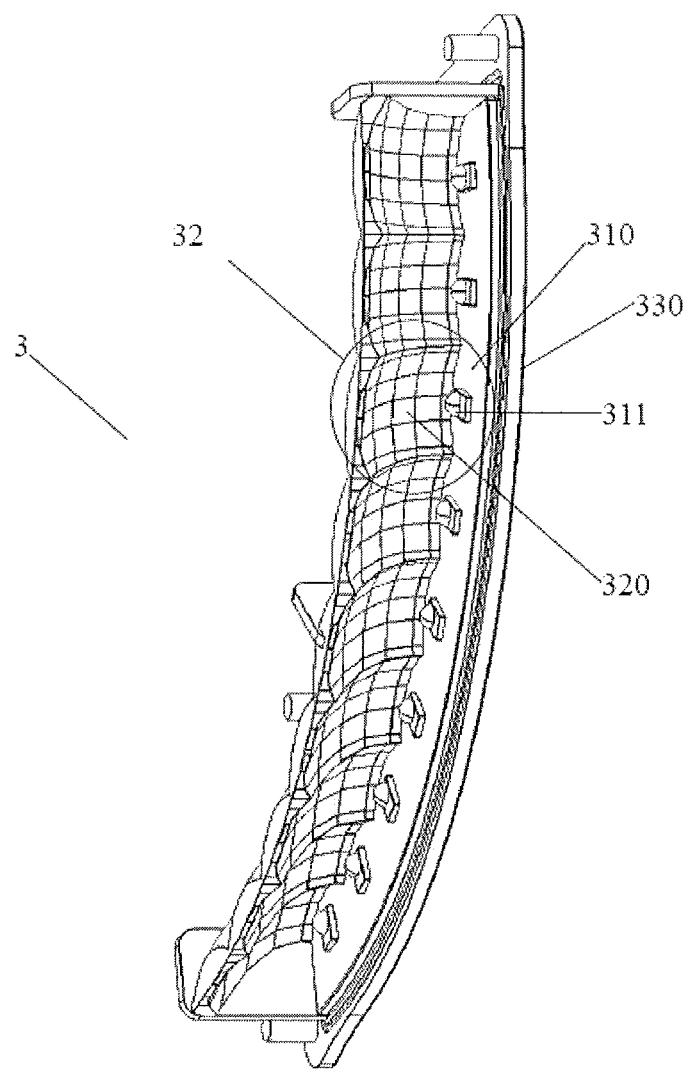
FIG. 2 is a structurally schematic view showing a side of curved light unit 3 having reflective unit, according to the embodiment of the LED warning light of the invention.
Figure 6:
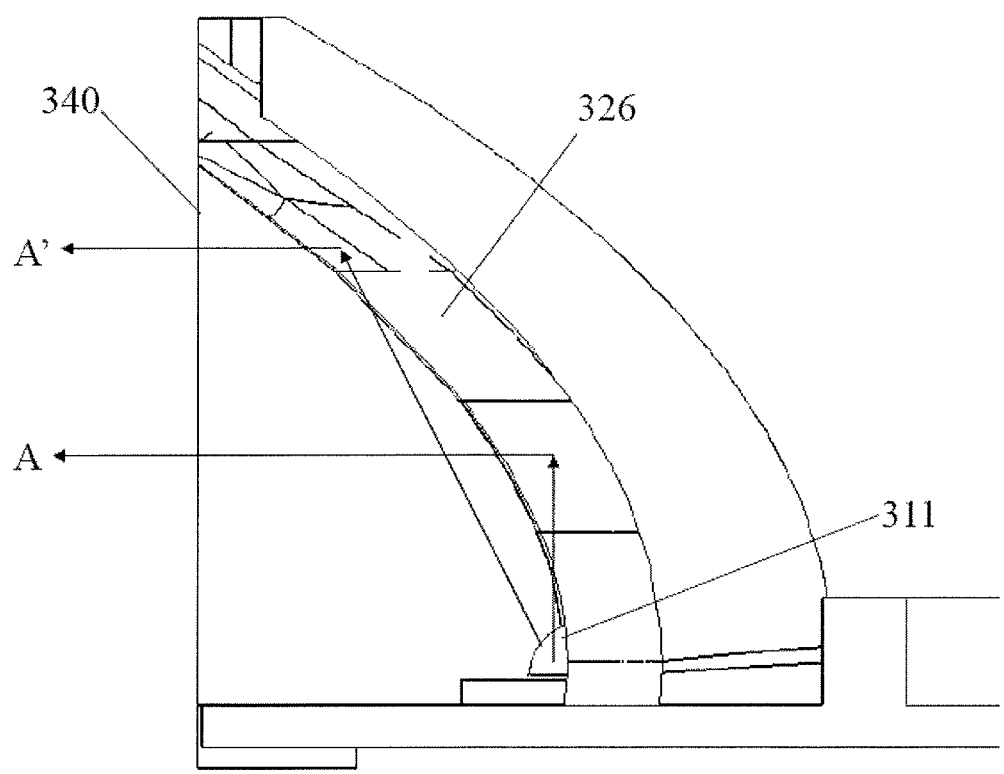
FIG. 6 is a schematic view showing a positional relationship between the reflective plate, light body and light transmission surface/front cover of the light cover, according to the embodiment of the LED warning light of the invention.

As shown in FIG. 2, the curved light unit 3 has light reflective elements 32' that are the same as the light reflective elements 32 of the straight light units 2. Difference from the straight light units 2 is in that the light reflective elements 32' of the curved light unit 3 are continuously arranged in a curved line, while the light reflective elements 32 of the straight light units 2 are continuously arranged in a straight line. The straight light units 2 and the curved light unit 3 are configured to form a light emitting surface of the warning light bar upon connecting their peripheries. Accordingly, each of reflective plate 320 corresponds to a LED 311, and light ray gives off as shown in FIG. 6.

In the straight light units 2, the reflective plate 320 and the light base 310 are both arranged inside the heat dispersion cover 350, such that the three components defines the thickness of the straight light units 2 together. It is not expected to further reduce the thickness of reflective plate 320 having upper and lower portions and the thickness of light base 310 due to heat dispersion and wiring. That is the thickness of straight light unit 2 depends on the height of the reflective plate 320.

Figure 7:
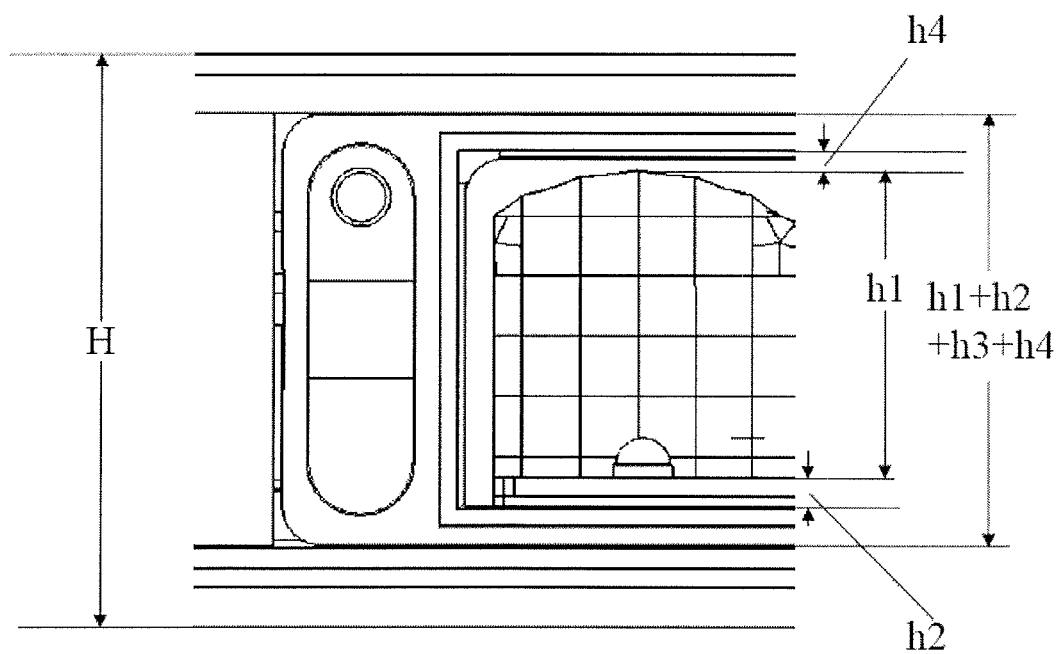
FIG. 7 is a schematic view showing a relationship between the thickness of the straight light unit 2 and the thicknesses of inner reflective plate, light body and heat dispersion plate, according to the embodiment of the LED warning light of the invention.

As shown in FIG. 7, in the straight light units 2, when the reflective plate 320 has an effective height h1 of approximately 11.5 mm, the light base 310 has a thickness h2 of 1 mm and the heat dispersion plate 330 has a thickness h3 of effective portion of 2 mm, the thickness H of the warning light body 1 would be 20 mm. In order to obtain a height H of 20 mm, h4 must be zero. It is shown in light distribution simulation observation of the LED warning light according to this embodiment that when Shuen series Blue ELSH—E61BX 350 mA/13 lm x9 x4 manufactured by Everlight is employed as light source and ECE R65 Category T by Day/Blue (TB1) as criterion of rule, the values of light distribution are as follows:

verticality 0°/360° complete cycle: ~>210 cd (rule >120 cd)

verticality −4°~4°/360° complete cycle: ~>90 cd (rule >60 cd)

It can be seen that, with the configuration of the invention, the light intensity of LED is significantly higher than that of criterion of rule. Reflectivity of the reflective surfaces is 70%. The brightness of light spots in vision has an improvement of 20% compared with conventional lenses. Further, in the case of a thickness of only 20 mm, it still reaches and even exceeds the criterion of rule.

In addition, the front cover 340 and the light base 310 are connected through adhesive instead of bolts. Thus the thickness space required for connecting by bolts can be saved, such that the thickness of the warning light bar can be reduced and maintenance serving would also become simple and convenient for the future.

Second Embodiment

The structure of this embodiment is substantially the same as the first embodiment, except that when the reflective plate 320 has an effective height h1' of approximately 15.5 mm, the light base 310 still has a thickness h2' of 1 mm and the heat dispersion plate 330 still has a thickness h3' of effective portion of 2 mm, the thickness H' of the warning light body 1 would be 32 mm.

It is obvious from above embodiments that, in the technical solution of the invention, the finished thickness of the whole warning light body will depend on the effective height of the reflective plate. That is, the less the height of reflective plate is, the thinner the whole warning light body. The effective height of the reflective plate mentioned in above embodiments refers to a portion of height of the reflective plate having light reflective function, namely the vertical distance from the upper periphery of the top light reflective element of the reflective plate arc to the light base on which LEDs are mounted. As shown in FIG. 7, for the thickness of the whole warning light, except for the necessary outside frame, the height of remainder is formed by the thickness h3 of heat dispersion plate, the thickness h2 of light base and the height (h1+h4) of reflective plate, in which the thickness h3 of heat dispersion plate, the thickness h2 of light base and the effective height of reflective plate h1 are not able to be omitted. Therefore, in order to reduce the whole height of the reflective plate as possible, remainder height h4 other than the effective height of reflective plate shall be cancelled. That is, the portion h4 from the top arc of the reflective plate to the inner surface of the heat dispersion plate shall be reduced as possible, or in other words, h4 shall be more than or equal to zero. Such a technical method can be achieved.

The LED warning light, without an increase of the intensity of light source, effectively improves the illumination range of the LED warning light and reduces the loss of light. The thickness of the warning light body is greatly reduced, while the luminous effect can be ensured.

While the preferred embodiments of present invention have been described above, it should be apparent to ordinary person skilled in the art that various improvements and modifications can be made to the present invention without departing from the technical principle of the present invention. Those improvements and modifications should be fallen into protection scope of the present invention.

The invention claimed is:

1. A LED warning light, wherein, it comprises a warning light body, straight light units and curved light units; said straight light units are fixed to the straight peripheries of said warning light body, and said curved light units are fixed to joints adjacent to two respective straight peripheries;
    said straight light unit includes a light base, a reflective plate, a heat dispersion cover and a front cover, said heat dispersion cover and said front cover are configured to form a first hermetical space in which said reflective plate and said light base are positioned; LED lights are arranged on said light base, said reflective plate is placed on one side of said LEDs, and said front cover is perpendicular to said light base oppositely to said reflective plate; said reflective plate is formed by a plurality of light reflective elements which are connected to each other in a straight line, and light rays emitted from said LEDs are reflected by said reflective plate and then given off perpendicularly to said front cover; the vertical distance from upper periphery of the arc top of the light reflective element to the corresponding inner surface of said heat dispersion cover is more than or equal to zero.

2. The LED warning light according to claim 1, wherein, said curved light unit includes a curved light base, a curved reflective plate, a heat dispersion plate and a light cover, said curved reflective plate, said curved light base and said heat dispersion plate are connected sequentially; said curved reflective plate light is formed by the reflective elements which are connected and arranged in a curved line; said light cover and said heat dispersion plate are configured to form a second hermetical space and said light cover is transparent; the vertical distance from upper periphery of the arc top of the light reflective element to the corresponding inner surface of the top of said light cover is more than or equal to zero.

3. The LED warning light according to claim 2, wherein, the thickness of said warning light body is more than or equal to 20mm.

4. The LED warning light according to claim 3, wherein, one side of said reflective plate opposing to said LEDs is a smooth curved surface.

5. The LED warning light according to claim 4, wherein, said light reflective element includes +reflective pieces connected to each other.

6. The LED warning light according to claim 5, wherein, it comprises four said curved light units.

7. The LED warning light according to claim 6, wherein, the radian of said curved light units is a quarter of a circle.

8. The LED warning light according to claim 3, wherein both said light cover and said front cover are connected to said light base through adhesive.

9. The LED warning light according to claim 1, wherein, said front cover is transparent.

* * * * *